(12) United States Patent
Fish et al.

(10) Patent No.: US 7,721,546 B2
(45) Date of Patent: May 25, 2010

(54) GAS TURBINE INTERNAL MANIFOLD MOUNTING ARRANGEMENT

(75) Inventors: Jason Fish, Brampton (CA); Bhawan Patel, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 666 days.

(21) Appl. No.: 11/488,801

(22) Filed: Jul. 19, 2006

(65) Prior Publication Data

US 2008/0016869 A1 Jan. 24, 2008

Related U.S. Application Data

(63) Continuation-in-part of application No. 11/034,838, filed on Jan. 14, 2005, now abandoned.

(51) Int. Cl.
*F02C 1/00* (2006.01)
*F02G 3/00* (2006.01)

(52) U.S. Cl. ......................... 60/739; 60/796

(58) Field of Classification Search ............ 60/796, 60/798, 799, 800, 739, 734
See application file for complete search history.

(56) References Cited

U.S. PATENT DOCUMENTS

| 1,081,950 | A | 12/1913 | Eller |
|---|---|---|---|
| 2,443,373 | A | 6/1948 | Borsoff |
| 4,332,626 | A | 6/1982 | Hood et al. |
| 4,377,420 | A | 3/1983 | Granatek et al. |
| 4,472,133 | A | 9/1984 | Petersen et al. |
| 4,703,888 | A | 11/1987 | Kawamura et al. |
| 4,870,943 | A | 10/1989 | Bradley et al. |
| 5,224,825 | A * | 7/1993 | Strang et al. ............. 415/209.3 |
| 5,249,417 | A * | 10/1993 | Duesler et al. ............. 60/772 |
| 5,291,733 | A * | 3/1994 | Halila ..................... 60/796 |
| 5,771,696 | A | 6/1998 | Hansel et al. |
| 5,797,266 | A | 8/1998 | Brocard et al. |
| 5,938,402 | A | 8/1999 | Bochud et al. |
| 5,944,483 | A | 8/1999 | Beck et al. |
| 6,256,995 | B1 | 7/2001 | Sampath et al. |
| 6,503,334 | B2 | 1/2003 | Ruiz et al. |
| 6,712,080 | B1 | 3/2004 | Handschuh et al. |

* cited by examiner

*Primary Examiner*—Michael Cuff
*Assistant Examiner*—Andrew Nguyen
(74) *Attorney, Agent, or Firm*—Ogilvy Renault LLP

(57) ABSTRACT

A mounting system for an annular internal fuel manifold of a gas turbine engine includes three supports equally spaced apart about the annular fuel manifold, the three supports having at least two pin supports disposed between the fuel manifold and a surrounding gas generator casing. Each pin support includes a radially extending pin co-operating with an aligned ring slidingly disposed around the pin for relative sliding displacement therebetween. The pin supports providing axial constraint while permitting the fuel manifold to radially displace relative to the surrounding gas generator casing due to thermal size change.

11 Claims, 5 Drawing Sheets

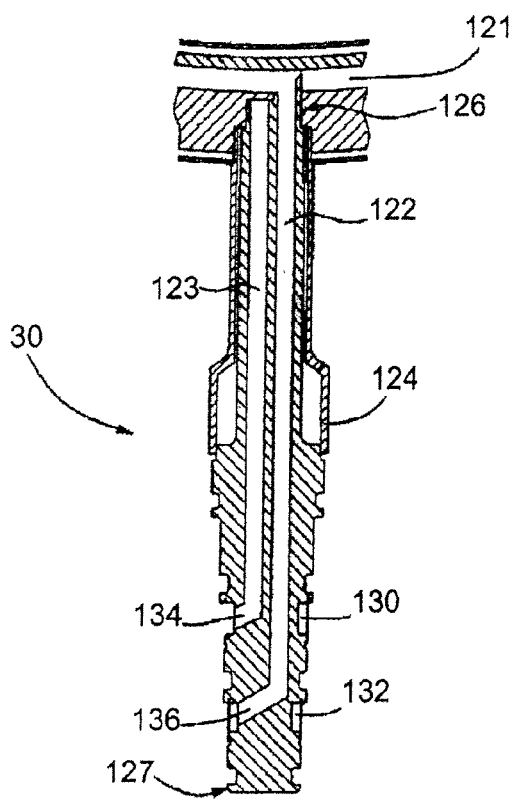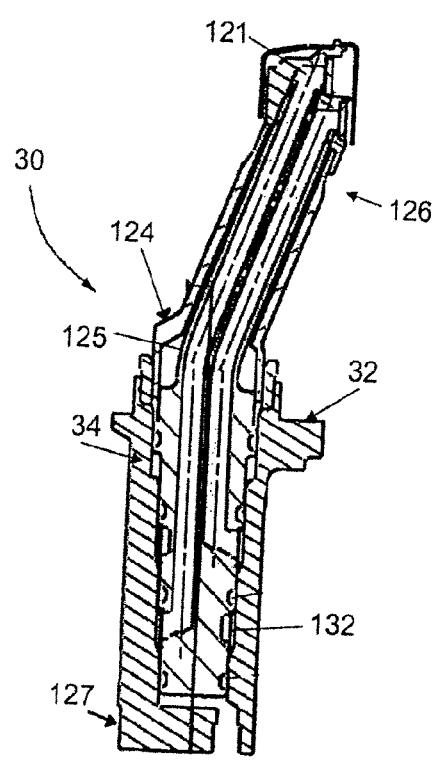
Figure 4
Figure 5

GAS TURBINE INTERNAL MANIFOLD MOUNTING ARRANGEMENT

RELATED APPLICATION DATA

This application is a continuation-in-part of U.S. patent application Ser. No. 11/034,838 filed Jan. 14, 2005, now abandoned, the specification of which is incorporated herein by reference.

TECHNICAL FIELD

The technical field relates generally to an internal fuel manifold for a gas turbine engine.

BACKGROUND OF THE ART

Gas turbine engine internal fuel manifolds are typically located inside the engine case adjacent the engine combustor, and thus reside in an extremely hot environment. As is typical with other hardware mounted inside a gas turbine engine, complex connections are required to allow for thermal expansion and accommodate mismatches in thermal expansion which may exist between components made of different materials. Complex systems are more difficult to make and assemble, and tend to add weight and cost. Therefore, there is a continuing need to provide improvements to gas turbine internal manifold mounting systems.

SUMMARY OF THE INVENTION

It is an object of the present invention to provide an improved mounting system for an internal fuel manifold of a gas turbine engine.

There is therefore provided, in accordance with one aspect of the present invention, a fuel injection system for gas turbine engine including a compressor, a combustor and a turbine, comprising: an annular internal fuel manifold disposed adjacent the combustor within a surrounding gas generator casing, the fuel manifold having at least one fuel conveying passage therein in fluid flow communication with a plurality of fuel injection nozzles disposed along the fuel manifold and adapted to spray fuel into the combustor; and a mounting system supporting and positioning the fuel manifold relative to the combustor within said gas generator casing, the mounting system including three supports equally spaced apart about the annular fuel manifold, the three supports including at least two pin supports disposed between the fuel manifold and the gas generator casing and each including a radially extending pin co-operating with an aligned ring slidingly disposed around the pin for relative sliding displacement therebetween, at least the pin supports providing axial constraint while permitting the fuel manifold to radially displace relative to the surrounding gas generator casing due to thermal size change.

There is also provided, in accordance with another aspect of the present invention, a mounting system for an annular internal fuel manifold disposed within a gas generator casing of a gas turbine engine, the mounting system comprising at least one pin and at least one corresponding lug, the lug being disposed on the fuel manifold in alignment with the pin and having an opening defined therein, an outer end of the pin having a means for fastening the pin to said gas generator casing and an inner end thereof projecting radially inwardly when the outer end is fastened to said gas generator casing, and the inner end of the pin being received within the opening of the lug such that relative sliding displacement therebetween is permitted along a longitudinal axis of said pin, said lug and said pin thereby mating together to define a support for said fuel manifold which provides axial constraint while permitting radial thermal expansion.

There is further provided, in accordance with another aspect of the present invention, an internal fuel manifold assembly for a gas turbine engine comprising: a fuel manifold ring having at least one fuel conveying passage therein in fluid flow communication with a plurality of fuel injection nozzles adapted for spraying fuel into a combustor of the gas turbine engine; and a mounting system for supporting and positioning the fuel manifold ring within the gas turbine engine, the mounting system including at least one lug disposed on a periphery of the fuel manifold ring and a fuel inlet to the annular fuel manifold body, the lug having a radially oriented hole therein adapted for slidingly receiving a corresponding radially extending support pin therein, the fuel inlet providing both fuel flow to the fuel conveying passage and load bearing support for the fuel manifold ring.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 4 is a front view, in cross-section, of the fuel inlet tube of the fuel manifold of FIG. 2;

FIG. 5 is a side view, in cross-section, of the fuel inlet tube of FIG. 4;

DETAILED DESCRIPTION OF THE PREFERRED EMBODIMENTS

Figure 1:
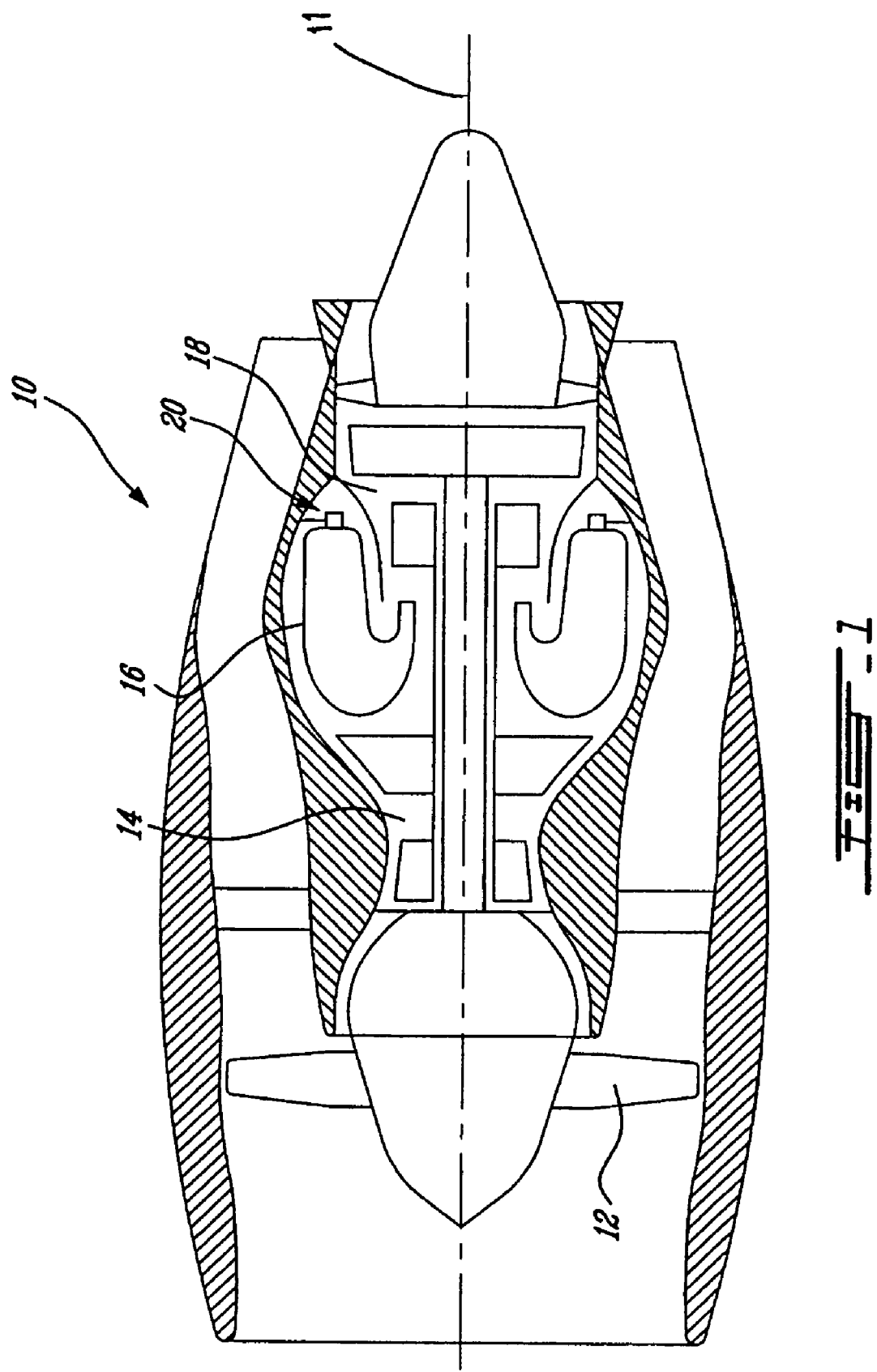
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
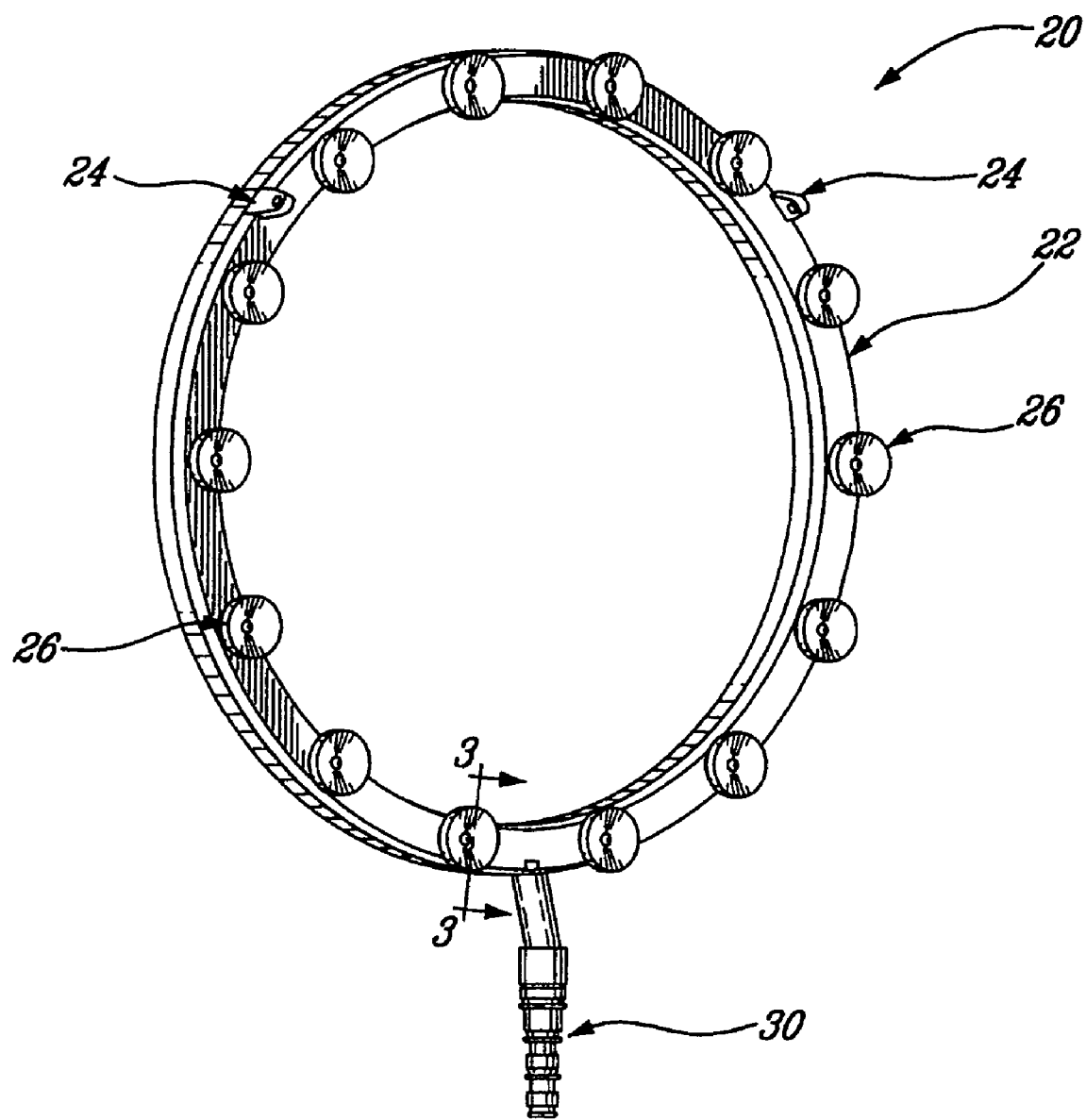
FIG. 2 is a perspective view of a fuel manifold incorporating a mounting system in accordance with the present invention, for use in a gas turbine engine such as that depicted in FIG. 1.

Referring to FIG. 2, the fuel injection system 20 includes at least one fuel conveying member through which fuel flows. In the exemplary embodiment, the fuel injection system includes an annular fuel manifold ring 22 which is mounted adjacent to the combustor 16 in the gas turbine engine 10. The fuel manifold ring 22 is preferably mounted within the engine 10 via a pair of integral attachment lugs 24 which receive pins (not shown) engaged to the engine, as will be discussed further below. This provides a mounting system/mechanism which allows for thermal expansion of the fuel manifold ring 22 at high temperatures, as will also be discussed further below. A plurality of fuel injecting nozzle assemblies 26 are provided about the circumference of the fuel manifold ring 22. The fuel nozzle assemblies 26 atomize the fuel as it is injected into the combustor for ignition when mixed with the compressed air therein. Fuel enters the annular fuel manifold ring 22 via fuel inlet tube 30, and is distributed within the manifold ring 22 such that fuel flow is provided to each of the fuel nozzles assemblies. Both the fuel manifold ring 22 and the fuel injecting nozzle assemblies 26 comprise fuel conveying members.

Figure 3:
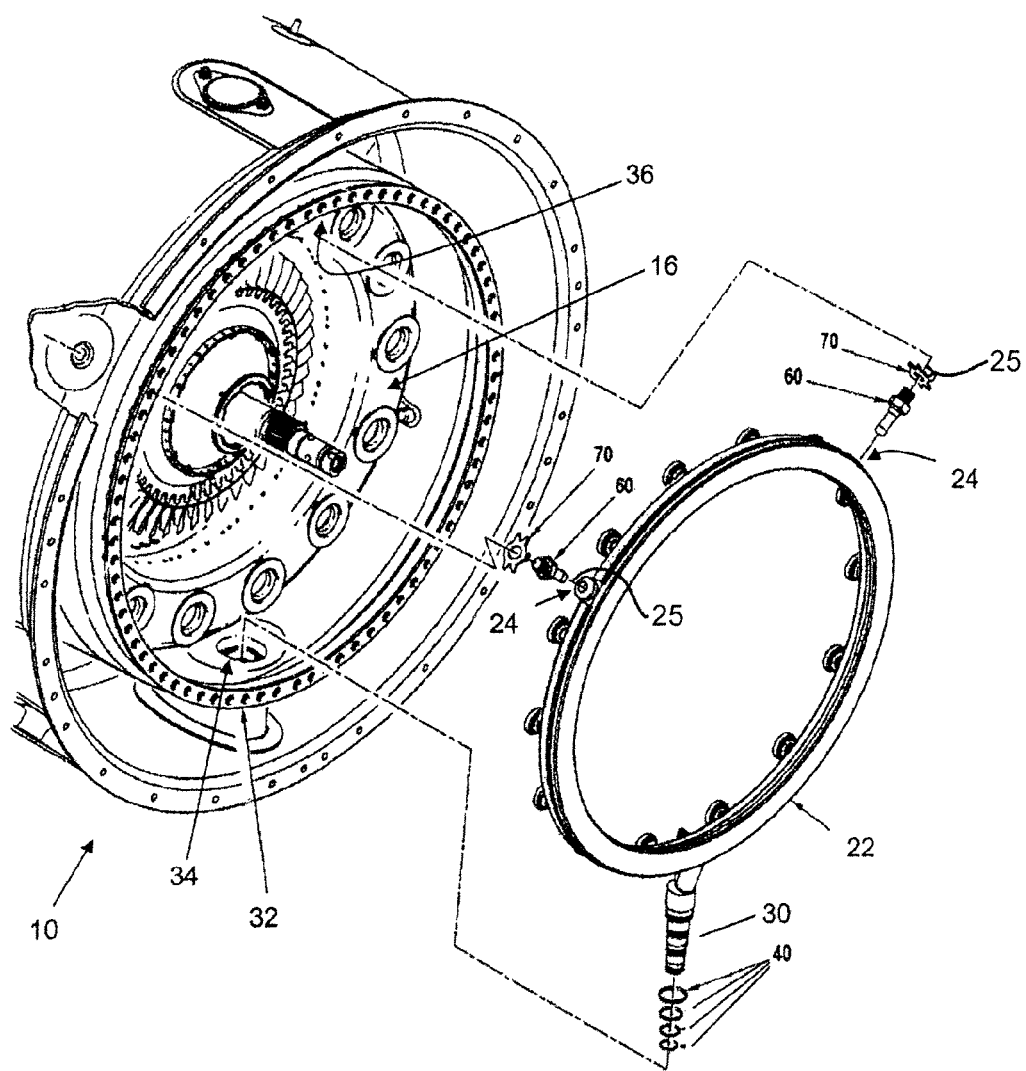
FIG. 3 is an exploded perspective view of a portion of a gas turbine assembly including the fuel manifold of FIG. 2 incorporating a mounting system in accordance with the present invention.

Referring to FIG. 3, fuel manifold ring 22 is installed within a gas generator case 32 of gas turbine engine 10 by a mounting system supporting and positioning the fuel manifold relative to the combustor within the gas generator case. The mounting system includes three supports, which in the present embodiment include two pin supports and the fuel inlet 30, as will be described further below. The three supports are preferably equally spaced apart about the annular fuel manifold, and include at least two pin supports as will be described. The lower portion of the manifold ring 22 is supported within gas generator case 32 by the generally radial insertion of radially extending fuel inlet tube 30 within boss 34 in the gas generator case 32. A plurality of o-rings 40 are provided for sealing, as described further below. Referring briefly to FIGS. 4-5, inlet tube is received within a bushing in the boss 34 of the gas generator case 32 and held therein by a loose fit, such that sliding radial displacement of the inlet tube 30 within the bushing of the casing is allowed. As such, radial growth between the fuel manifold and the surrounding case is permitted at the inlet tube 30, as well as at the lugs 24 (described in further detail below). The o-rings 40 provide principally a sealing function, however should the fit between the inlet tube and the mating bushing of the casing wear, then the o-rings and other packings will also take some load. The packings also provide some damping to the system by cushioning the interface between the fuel inlet and the gas generator case. Axial and radial loads for supporting for the fuel manifold ring 22 can therefore be borne by all by the three supports, namely the fuel inlet/bushing support described above, and two pin/lug supports. That is, the weight of the fuel manifold is distributed about the three supports, as are any other forces acting on the fuel manifold, such as fuel pressure, vibrations, engine loads, etc. The term radial and axial loads as used herein is understood to mean loads which the supports must bear in the radial and axial directions (relative to the engine axis 11) in order to adequately support the fuel manifold in a correct position within the engine casing in relation to the combustor thereof.

In one embodiment, the three supports are substantially equally spaced about the circumference of the annular fuel manifold 22 (i.e. they are spaced 120 degrees apart), such as to define a Y-shaped support configuration. This configuration helps balance radial and axial loads between the three support points. In this embodiment, the inlet tube 30 is preferably located at the bottom or lower most point (i.e. the 6 o'clock position) of the annular fuel manifold 22 (when the engine is horizontal, such as when the engine is disposed in an normal flight attitude position for example, as shown in FIGS. 1 and 3, with the inlet tube 30 at the bottom of the ring 22), and the two pin/lug support points are disposed on the upper portion of the annular manifold, about 120 degrees from the lower fuel inlet 30, at the 10 o'clock and 2 o'clock positions.

Figure 6:
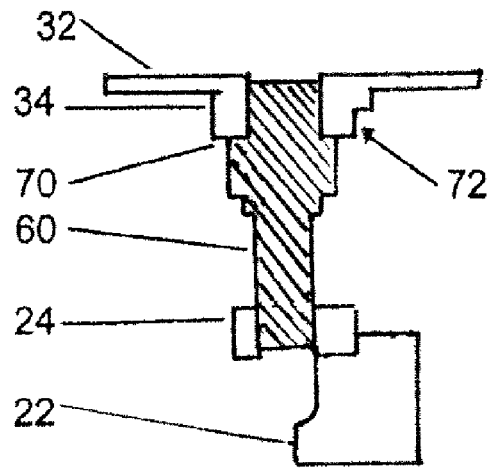
FIG. 6 is a side view, in cross-section, of a support pin supporting the mounting system of FIG. 3.
Figure 7:
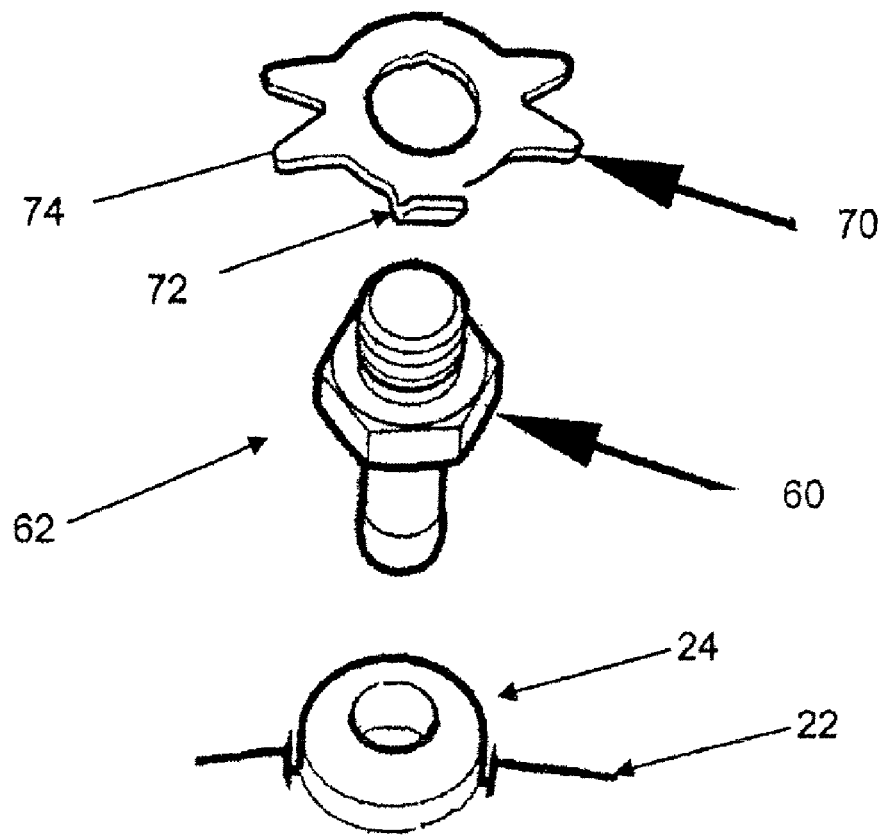
FIG. 7 is an exploded perspective view of the support pin of FIG. 6.

Referring again to FIG. 3, the upper portion of manifold ring 22 is supported within gas generator case 32 by the generally radial insertion of a pair of radially extending pins 60 into corresponding bosses 36 in the gas generator case 32, the pins having a free end inner extending inwardly therefrom into the gas generator case 32 and adapted to pass generally radially through openings in the lugs 24 of the fuel manifold ring 22. Referring briefly to FIGS. 6-7, each pin 60 has an outer end with a means for fastening it to the surrounding casing. This means for fastening can include any suitable method of attaching, either permanently or removably, to the casing, such as by direct threaded engagement, nut, lock-pin, bonding, welding, compression flange, etc. In one embodiment, the outer end of each pin 60 is threaded into its respective boss 36, with anti-rotation provided by an anti-rotation ring 70 mounted to the pin and having a tab 72 which engages a corresponding cut-out in the boss and having tangs 74 which are bent up around the flats of the support pin or of a nut portion 62 used to fasten the pin 60 in place. Thus, in normal flight attitude, the weight of manifold ring 22 is generally supported by the two pins 60 as well as the inlet tube 30. While the inlet tube 30 bears some of the weight of the fuel manifold (i.e. provides some load bearing capability, it is the two pins 60 which support a majority of the weight of the manifold during normal engine operation, at least partially due to their angled orientation (i.e. radially inwardly extending along respective pin axes 25 which intersect at a center midpoint of the annular manifold—which is also coincident with the longitudinal main engine axis 11 (see FIG. 1)). The inlet tube therefore provides a third support point within the same plane (perpendicular to the main engine axis 11) which defines the axially position of the manifold. Each of the three support points, allows for thermal size change (i.e. thermal growth and/or reduction) between the fuel manifold and the gas generator casing. At least the pin supports provide axial constraint while permitting the fuel manifold to radially displace relative to the surrounding gas generator casing due to thermal size change. However, in this embodiment both the upper pin-lug supports and the central lower inlet tube/bushing support allow for relative radial sliding displacement between the manifold and the casing, while axially constraining relative movement therebetween. The term "constraint" or "constraining" as used herein is intended to mean limiting movement and/or thermal size change, and as such the three supports are said to be axially constrained as they limit substantially axial movement or growth of the fuel manifold, while nonetheless allow displacement in a radial direction such as to accommodate radial thermal growth/shrinking.

Inlet tube 30 preferably has a design of the type described in applicant's pending U.S. patent application Ser. No. 10/764,578, published Jul. 28, 2005, the contents of which is incorporated herein by reference. Referring to FIGS. 4 and 5, a fuel inlet tube 30 has a distal end 126 and a proximal end 127. The distal end 126 is connected to a fuel manifold 121 which usually surrounds the combustor 16 and delivers fuel to a plurality of fuel nozzles located within the combustor. The inlet tube 30 preferably comprises a primary channel 122 and a secondary channel 123, both channels being axially defined in the tube and being located side by side. The channels 122, 123 are in fluid communication with the manifold 121. The inlet tube 30 is covered by a heat shield 124 at the distal end 126, the heat shield 124 being in contact with the manifold 121 in order to protect the inlet tube 30 against heat damage. The inlet tube 30 can include a bend 125, which is preferably defined along an axis perpendicular to a plane including the axes of both channels 122, 123, in order to compensate for an offset between the fuel manifold and the fuel source without compromising a fuel flow in the channels 122, 123. Such a bend eliminates the need for a multi-piece assembly and thus reduces the need for weld or braze during assembly. In operation, fuel is injected in the grooves 130, 132 and enters the channels 122, 23 through the side feed inlets 134, 36.

Referring again to FIG. 3, the inlet tube 30 and support pins 60 are fixed axially within a common plane (i.e. with reference to the engine axis 11) within gas generator case 32, and therefore fix the axial location of the fuel manifold ring within the case. The radially sliding fit between pins 60 and lugs 24 and between the fuel inlet tube 30 and the mating bushing of the casing's boss, however, allows the ring 22 to thermally grow and shrink radially (i.e. with reference to the engine axis), without introducing any significant stress on the inlet tube 30 or the lugs 24. Using this approach, the number of supports for fuel manifold ring 22 can be minimised, and the load on the pins 60 can be minimised. As well, the present arrangement avoids assembly tolerance stack-ups which normally occur, which thereby facilitates easy and quick assembly. Tolerance stack-ups are thus minimized by keeping the number of supports to only three, which is the minimum requirement to form an axial plane within which the fuel manifold must be located. Thus the fit between the pins and the mating lugs can be held to a minimum, without risk of tolerance stack-ups causing fit problems. Adding more pins (i.e. more support points) would necessitate loosing the axial tolerances between the pins and their mating lugs/rings, which is undesirable.

The above description is meant to be exemplary only, and one skilled in the art will recognize that changes may be made to the embodiments described without department from the scope of the invention disclosed. For example, alternate configurations of manifold support system and the fuel conveying members such as fuel manifolds and fuel nozzles can be used. The pin and lug configurations depicted are preferred, but of course not necessary to achieve the function taught herein. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

The invention claimed is:

1. A fuel injection system for gas turbine engine including a compressor, a combustor and a turbine, comprising:
    an annular internal fuel manifold disposed adjacent the combustor within a surrounding gas generator casing, the fuel manifold having at least one fuel conveying passage therein in fluid flow communication with a plurality of fuel injection nozzles disposed along the fuel manifold and adapted to spray fuel into the combustor; and
    a mounting system supporting and positioning the fuel manifold relative to the combustor within said gas generator casing, the mounting system including three supports equally spaced apart by approximately 120 degrees about the annular fuel manifold, the three supports including only two pin supports and a single radially extending fuel inlet providing fuel flow to the fuel conveying passage, the two pin supports and the fuel inlet disposed between the fuel manifold and the gas generator casing, each of the two pin supports including a radially extending pin co-operating with an aligned lug slidingly disposed around the pin for relative sliding displacement therebetween, said pin having an outer end removably engaged to the gas generator casing such that the pin is replaceable, the outer end of the pin being threaded and received within a corresponding threaded boss defined in an inner surface of the gas generator casing, the pin supports providing axial constraint while permitting the fuel manifold to radially displace relative to the surrounding gas generator casing due to thermal size change, and the fuel inlet providing both fuel flow to the fuel conveying passage and load bearing support for the fuel manifold ring.

2. The fuel injection system as defined in claim 1, wherein the fuel inlet provides axial constraint while permitting the fuel manifold to radially displace relative to the surrounding gas generator casing.

3. The fuel injection system as defined in claim 2, wherein the fuel inlet is received within a corresponding bushing within the gas generator casing, the fuel inlet being slidingly displaceable in a radially direction within said bushing.

4. The fuel injection system as defined in claim 2, wherein the fuel inlet and the two pin supports all bear axial and radial loads to support the fuel manifold.

5. The fuel injection system as defined in claim 4, wherein the two pin supports bear a majority of the axial and radial loads to support the fuel manifold when the gas turbine engine is in a normal flight attitude.

6. The fuel injection system as defined in claim 1, wherein the fuel inlet is disposed at a lowermost point of the annular fuel manifold.

7. The fuel injection system as defined in claim 1, wherein the radially extending pin and the co-operating lug of said pin supports are respectively engaged to the gas generator casing and the fuel manifold, the pin and the lug being slidingly displaceable relative to each other.

8. The fuel injection system as defined in claim 1, wherein an inner end projects radially inwardly from the outer end of the pin, the inner end of the pin being received within a corresponding opening in the lug.

9. The fuel injection system as defined in claim 1, wherein an anti-rotation ring is mounted to the pin such as to prevent unwanted rotation thereof within the boss of the gas generator casing.

10. A fuel injection system for a gas turbine engine including a compressor, a combustor and a turbine, comprising: an annular internal fuel manifold disposed within a gas generator casing of the gas turbine engine; and a mounting system for supporting and positioning the fuel manifold within the gas generator casing relative to the combustor, the mounting system including only three supports equally spaced apart about the annular fuel manifold, the three supports including two pin supports and a single fuel inlet, the two pin supports each including a radially extending pin and a corresponding lug, the lug being disposed on the fuel manifold in alignment with the pins and having an opening defined therein, an outer end of each said pin having a means for fastening the pin to said gas generator casing and an inner end thereof projecting radially inwardly when the outer end is fastened to said gas generator casing, said means for fastening include a thread cooperating with a corresponding threaded boss defined in an inner surface of the gas generator casing and within which the outer end is received, and the inner end of the pin being received within the opening of the lug such that relative sliding displacement therebetween is permitted along a longitudinal axis of said pin, said lug and said pin thereby mating together to define a support for said fuel manifold which provides axial constraint while permitting radial thermal expansion.

11. The fuel injection system as defined in claim 10, further comprising an anti-rotation ring mounted to the pin such as to prevent unwanted rotation thereof relative to the gas generator casing.

* * * * *